United States Patent
Backstrom et al.

(10) Patent No.: US 7,846,299 B2
(45) Date of Patent: Dec. 7, 2010

(54) APPARATUS AND METHOD FOR CONTROLLING PRODUCT GRADE CHANGES IN A PAPER MACHINE OR OTHER MACHINE

(75) Inventors: Johan U. Backstrom, North Vancouver (CA); Mattias Bjorklund, North Vancouver (CA)

(73) Assignee: Honeywell ASCa Inc., Ontario (CA)

( * ) Notice: Subject to any disclaimer, the term of this patent is extended or adjusted under 35 U.S.C. 154(b) by 825 days.

(21) Appl. No.: 11/796,879

(22) Filed: Apr. 30, 2007

(65) Prior Publication Data

US 2008/0264591 A1 Oct. 30, 2008

(51) Int. Cl.
*D21F 7/00* (2006.01)
(52) U.S. Cl. .............. 162/253; 162/262; 162/DIG. 10; 700/127
(58) Field of Classification Search .............. 162/252, 162/253, 259, 262, DIG. 6, DIG. 10, DIG. 11; 700/127–129
See application file for complete search history.

(56) References Cited

U.S. PATENT DOCUMENTS

| | | | | |
|---|---|---|---|---|
| 3,801,426 | A * | 4/1974 | Putman et al. | 162/198 |
| 3,886,036 | A * | 5/1975 | Dahlin | 162/198 |
| 5,718,060 | A * | 2/1998 | Mori | 34/446 |
| 6,473,670 | B1 * | 10/2002 | Huhtelin | 700/128 |
| 6,605,185 | B2 * | 8/2003 | Sasaki et al. | 162/198 |

OTHER PUBLICATIONS

Smook, Gary A., Handbook for Pulp & Paper Technologists, Angus Wilde Publications, 1992, pp. 323-328.*
Murphy, Timothy F. et al., Transition Control of Paper-making Processes: Paper Grade Change, Proceedings of the 1999 IEEE International Conference on Control Applications, Aug. 1999, pp. 1278-1283.*
Timothy F. Murphy et al., "Transition Control of Paper-making Processes: Paper Grade Change," Proceedings of the 1999 IEEE International Conference on Control Applications, Aug. 22-27, 1999, pp. 1278-1283.
"Performance MD (DVE) Grade Change User's Manual," Honeywell, Mar. 2002, 36 pages.
"Performance MultiVariable MD Version 3.0 User's Manual," Honeywell, Jun. 2003, 309 pages, See esp. Section 8.

(Continued)

*Primary Examiner*—Eric Hug
(74) *Attorney, Agent, or Firm*—Munck Carter, LLP

(57) ABSTRACT

A paper machine includes equipment for processing or producing a product in a continuous manner, such as a paper sheet. A grade change occurs when the equipment transitions from producing or processing a product having a first grade to producing or processing a product having a second grade. To support the grade change, a target for at least one controlled variable and a target for at least one manipulated variable are identified. The at least one manipulated variable and the at least one controlled variable are associated with the production of the product. A trajectory for the at least one manipulated variable and a corresponding trajectory for the at least one controlled variable are identified using the targets. The grade change is implemented using the trajectories so as to transition from production of the product having the first grade to production of the product having the second grade.

20 Claims, 8 Drawing Sheets

OTHER PUBLICATIONS

Yang Wang et al., Optimal Grade Transition Control for Polymerization Reactors, Computers & Chemical Engineering, Oxford, GB, vol. 24, Jan. 2000 pp. 1555-1561.

Hiroya Sekia et al., Industrial Application of a Nonlinear Model Predictive Control to Polymerization Reactors, Cont. Eng. Practice, Oxford, GB, vol. 9, Jan. 2001, pp. 819-828.

Paavo Viitamaki, Hybrid Modeling of Paper Machine Grade Changes, [Online] Jan. 2004, URL:http://lib.tkk.ft/Diss/2004/isbn951227/1362/isbn9512271362.pdf, pp. 24-27.

Hauge T A et. al, Application and Roll-out of Infinite Horizon MPC Employing a Nonlinear Mechanistic Model to Paper Machines, Oxford, GB, vol. 15, No. 2, Mar. 2005, pp. 201-213.

* cited by examiner

APPARATUS AND METHOD FOR CONTROLLING PRODUCT GRADE CHANGES IN A PAPER MACHINE OR OTHER MACHINE

TECHNICAL FIELD

This disclosure relates generally to control systems and more specifically to an apparatus and method for controlling product grade changes in a paper machine or other machine.

BACKGROUND

Various systems are available and used to manufacture sheets of paper and other sheet products. The sheets of material often have multiple characteristics that are monitored and controlled during the manufacturing process, such as dry weight, moisture, and caliper (thickness). The control of these or other sheet properties in a sheet-making machine is typically concerned with keeping the sheet properties as close as possible to target or desired values.

Sheet-making machines are often capable of producing sheets of material having different grades. For example, paper grades are typically associated with different characteristics of paper sheets. Some example types of paper grades include bond, book, label, and newsprint grades. Many sheet-making machines are also capable of transitioning from the production of one grade of material to the production of another grade of material in a continuous fashion. In other words, the sheet-making machines continue producing a sheet of material, but the grade of the sheet changes during the production. As a result, the sheet-making machines do not need to be shut down and restarted in order to change the grade of the sheet being produced.

In many instances, a grade change frequently results in production losses, meaning the sheet of material produced during the grade change is often unmarketable. This is typically due to the sheet having one or more undesirable characteristics, which are caused by altering the production process to change the grade of the sheet being produced. This typically results in a waste of material and a loss of revenue.

SUMMARY

This disclosure provides an apparatus and method for controlling product grade changes in a paper machine or other machine.

In a first embodiment, a method includes identifying a target for at least one controlled variable and a target for at least one manipulated variable. The at least one manipulated variable and the at least one controlled variable are associated with production of a product. The method also includes identifying a trajectory for the at least one manipulated variable and a corresponding trajectory for the at least one controlled variable. The trajectories are identified using the targets. In addition, the method includes implementing a grade change using the trajectories so as to transition from production of the product having a first grade to production of the product having a second grade.

In particular embodiments, the product includes a paper sheet produced by a paper machine. The at least one controlled variable includes a dry weight of the paper sheet, an ash content of the paper sheet, and/or a moisture content of the paper sheet. The at least one manipulated variable includes a thick stock flow, a filler flow, a steam pressure associated with a dryer section in the paper machine, and/or a machine speed associated with the paper machine.

In other particular embodiments, identifying the target for the at least one controlled variable includes using a recipe associated with the second grade. Also, identifying the target for the at least one manipulated variable includes using the target for the at least one controlled variable.

In still other particular embodiments, identifying the trajectories includes performing an iterative process. The iterative process includes calculating values for the at least one manipulated variable, where the values form the trajectory for the at least one manipulated variable. The iterative process also includes calculating corresponding values for the at least one controlled variable, where the values form the trajectory for the at least one controlled variable. The iterative process further includes updating a process model used to identify the corresponding values for the at least one controlled variable. In addition, the iterative process includes repeating the calculating and updating steps until at least stop condition occurs.

In a second embodiment, an apparatus includes at least one processor operable to identify a target for at least one controlled variable and a target for at least one manipulated variable. The at least one manipulated variable and the at least one controlled variable are associated with production of a product. The at least one processor is also operable to identify a trajectory for the at least one manipulated variable and a corresponding trajectory for the at least one controlled variable using the targets. The at least one processor is further operable to implement a grade change using the trajectories so as to transition from production of the product having a first grade to production of the product having a second grade. The apparatus also includes at least one memory operable to store the targets and the trajectories.

In a third embodiment, a computer program is embodied on a computer readable medium. The computer program includes computer readable program code for identifying a target for at least one controlled variable and a target for at least one manipulated variable. The at least one manipulated variable and the at least one controlled variable are associated with production of a product. The computer program also includes computer readable program code for identifying a trajectory for the at least one manipulated variable and a corresponding trajectory for the at least one controlled variable. The trajectories are identified using the targets. In addition, the computer program includes computer readable program code for implementing a grade change using the trajectories so as to transition from production of the product having a first grade to production of the product having a second grade.

In a fourth embodiment, a system includes a paper machine operable to produce a paper sheet having multiple grades. The system also includes a controller operable to initiate a transition from a first grade to a second grade. The controller is operable to identify a target for at least one controlled variable and a target for at least one manipulated variable. The controller is also operable to identify a trajectory for the at least one manipulated variable and a corresponding trajectory for the at least one controlled variable using the targets. In addition, the controller is operable to implement the grade change using the trajectories so as to transition from production of the paper sheet having the first grade to production of the product having the second grade.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1A:
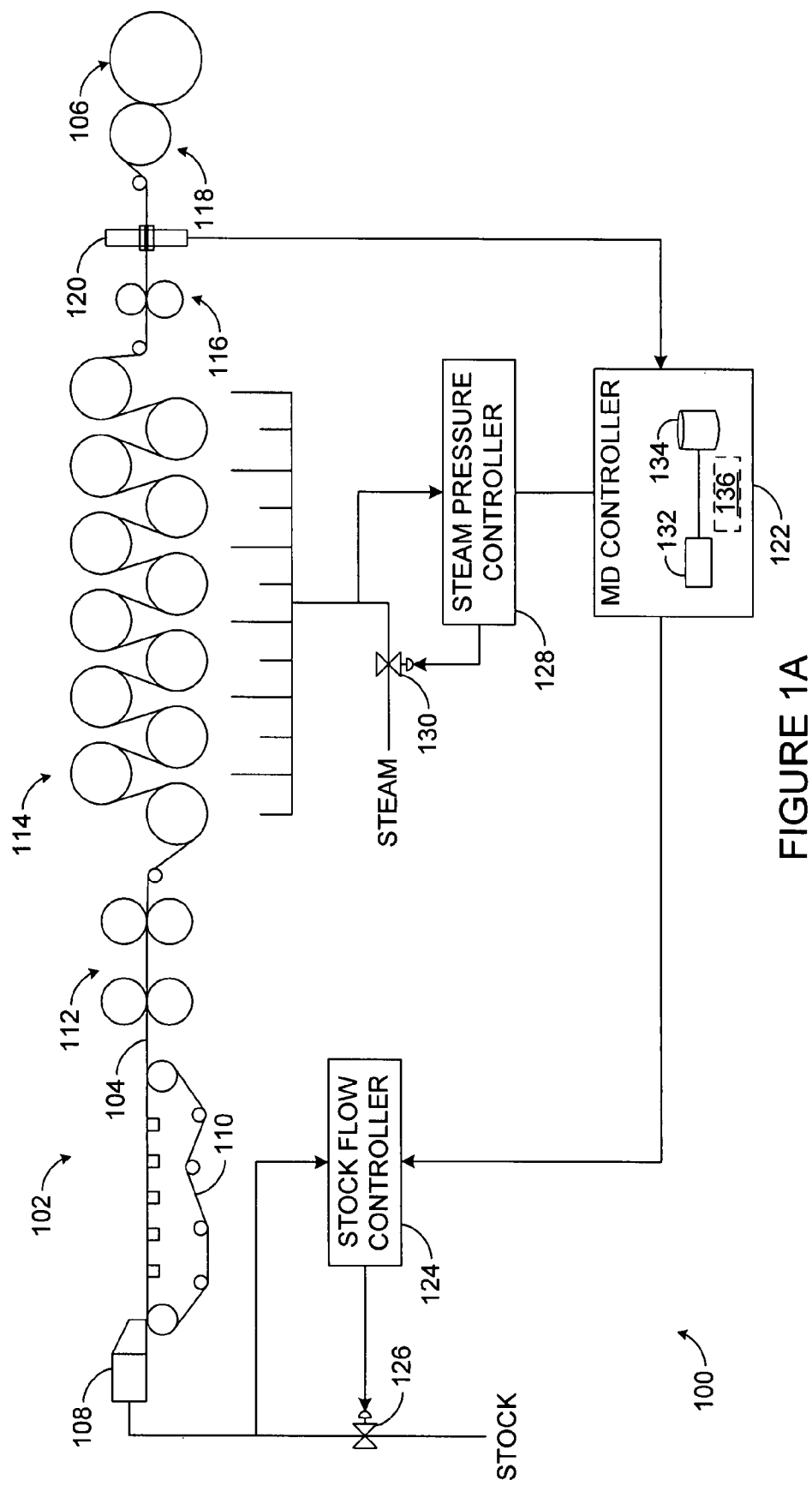
FIGS. 1A and 1B illustrate an example paper production system in accordance with this disclosure.
Figure 1B:
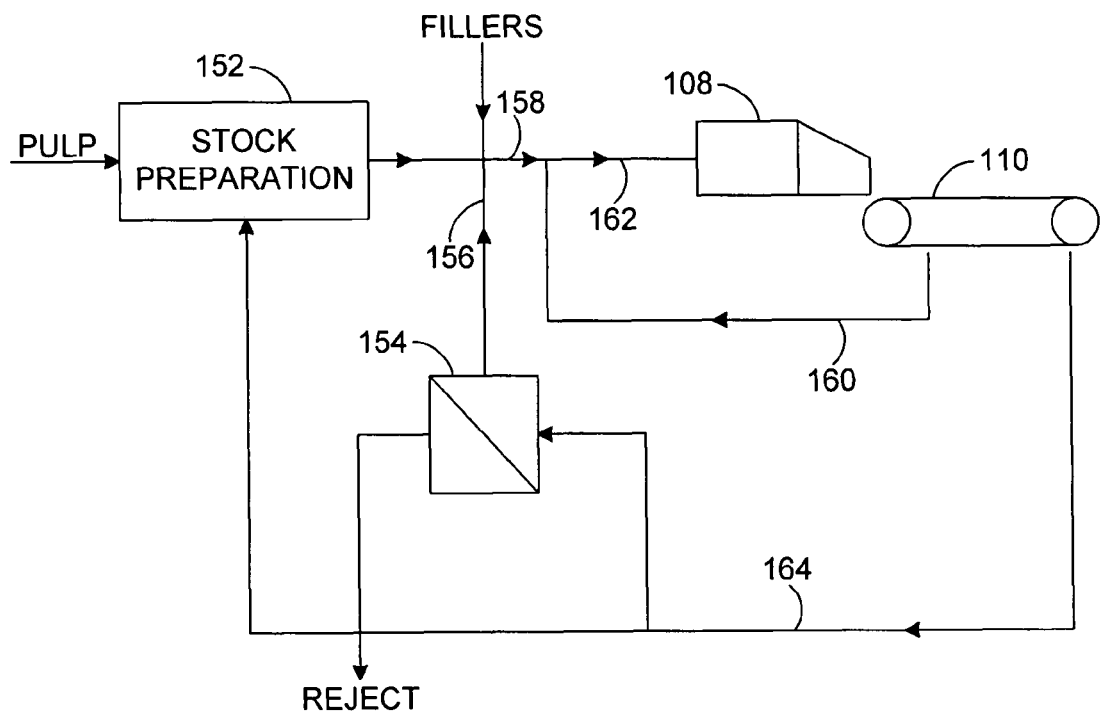

FIGS. 1A and 1B illustrate an example paper production system 100 according to one embodiment of this disclosure. The embodiment of the paper production system 100 shown in FIGS. 1A and 1B is for illustration only. Other embodiments of the paper production system 100 may be used without departing from the scope of this disclosure.

As shown in FIG. 1A, the paper production system 100 includes a paper machine 102. The paper machine 102 includes various components used to produce or process a paper product. In this example, the various components may be used to produce a paper sheet 104 collected at a reel 106.

In this example embodiment, the paper machine 102 includes a headbox 108, which distributes a pulp suspension uniformly across the machine onto a continuous moving screen or mesh 110. The pulp suspension entering the headbox 108 may contain, for example, 0.2-3% wood fibers and possibly other solids, with the remainder of the suspension being water. The headbox 108 includes any suitable structure for distributing a pulp suspension. The headbox 108 may, for example, include a slice opening through which the pulp suspension is distributed onto the screen or mesh 110. The screen or mesh 110 represents any suitable structure for receiving a pulp suspension and allowing water or other materials to drain or leave the pulp suspension.

The sheet 104 then enters a press section 112, which includes multiple press rolls. The sheet 104 travels through the openings (referred to as "nips") between pairs of counter-rotating rolls in the press section 112. In this way, the rolls in the press section 112 compress the pulp material forming the sheet 104. This may help to remove more water from the pulp material and to equalize the characteristics of the sheet 104 on both sides of the sheet 104. The press section 112 may include any suitable number of press rolls in any suitable arrangement for pressing the sheet 104.

The sheet 104 next enters a dryer section 114, which includes a series of heated rolls. The sheet 104 travels over the heated rolls, which heats the sheet 104 and causes more water in the sheet 104 to evaporate. Steam or any other heated substances can be used to impart heat to the heated rolls in the dryer section 114. The dryer section 114 may include any suitable number of heated rolls in any suitable arrangement for heating the sheet 104 and removing water from the sheet 104.

A calendar 116 processes and finishes the sheet 104. For example, the calendar 116 may smooth the sheet 104 and impart a final finish, thickness, gloss, or other characteristic to the sheet 104. Other materials (such as starch or wax) can also be added to the sheet 104 to obtain the desired finish. The calendar 116 may include any suitable number of calendar stacks in any suitable arrangement for finishing the sheet 104. Once processing by the calendar 116 is complete, a reel device 118 collects the sheet 104 onto the reel 106.

This represents a brief description of one type of paper machine 102 that may be used to produce a paper product. Additional details regarding this type of paper machine 102 are well-known in the art and are not needed for an understanding of this disclosure. Also, this represents one specific type of paper machine 102 that may be used in the system 100. Other machines or devices could be used that include any other or additional components for producing a paper product. In addition, this disclosure is not limited to use with systems for producing or processing paper products and could be used with systems that produce or process other items or materials, such as plastic, textiles, metal foil or sheets, or other or additional materials.

In order to control the paper-making process, the properties of the sheet 104 may be continuously or repeatedly measured and the paper machine 102 adjusted to ensure sheet quality. This control may be achieved by measuring sheet properties using a scanner 120. The scanner 120 is capable of scanning the sheet 104 and measuring one or more characteristics of the sheet 104. For example, the scanner 120 could carry sensors for measuring the dry weight, moisture content, ash content, or any other or additional characteristics of the sheet 104. The scanner 120 includes any suitable structure or structures for measuring or detecting one or more characteristics of the sheet 104, such as a set or array of sensors. A scanning set of sensors represents one particular embodiment for measuring sheet properties. Other embodiments could include using a stationary set or array of sensors.

Measurements from the scanner 120 are provided to a machine direction (MD) controller 122. The controller 122 controls various operations of the paper machine 102 that affect machine direction characteristics of the sheet 104. A machine direction characteristic of the sheet 104 generally refers to an average characteristic of the sheet 104 that varies and is controlled in the machine direction (the direction of travel of the sheet 104). The machine direction is generally perpendicular to the cross direction (CD) of the sheet 104 (the direction across the sheet 104).

In this example, the controller 122 is capable of controlling the supply of pulp to the headbox 108. For example, the controller 122 could provide information to a stock flow controller 124, which controls a valve 126. The stock flow controller 124 generally controls the opening and closing of the valve 126 to control the flow of stock (a mixture of pulp, filler, water, and other materials) to the headbox 108. The stock flow controller 124 uses information from the MD controller 122 as well as measurements of the stock flow to the headbox 108 to control the valve 126.

The controller 122 is also capable of controlling the supply of steam to the dryer section 114. For example, the controller 122 could provide information to a steam pressure controller 128, which controls a valve 130. The steam pressure controller 128 generally controls the opening and closing of the valve 130 to control the steam pressure in the dryer section 114. In this way, the steam pressure controller 128 controls the heating of the rolls in the dryer section 114, thereby controlling the amount of drying provided by the dryer section 114. The steam pressure controller 128 uses information from the MD controller 122 as well as measurements of the steam pressure to control the valve 130.

The MD controller 122 includes any hardware, software, firmware, or combination thereof for controlling the operation of a paper or other machine. The MD controller 122 could, for example, include at least one processor 132 and at least one memory 134 storing instructions and data used, generated, or collected by the processor(s) 132.

The stock provided to the headbox 108 is produced as shown in FIG. 1B. Here, pulp is provided to a stock preparation unit 152. The stock preparation unit 152 processes the pulp to prepare the pulp for use in making the sheet 104. For example, the stock preparation unit 152 could clean and refine the pulp fibers so that the pulp fibers have desired properties. The stock preparation unit 152 could also receive and process recycled fibers recovered from the screen or mesh 110. The stock preparation unit 152 includes any suitable structure(s) for preparing fibers or other materials for use in a paper machine.

The fibers provided by the stock preparation unit 152 are mixed with one or more fillers and with recycled materials provided by a retention unit 154. The resulting mixture represents a thick stock 158 and has a relatively high fiber consistency (such as around 4%). The thick stock 158 is then mixed with white water in a short circulation path 160 to produce a thin stock 162. The thin stock 162 has a relatively low fiber consistency (such as around 0.2%). The thin stock 162 is provided to the headbox 108 for use in forming the sheet 104. A long circulation path 164 provides recycled material to the retention unit 154 and the stock preparation unit 152 for recovery. The retention unit 154 may reject some of the material provided through the long circulation path 164.

In one aspect of operation, the MD controller 122 controls the stock flow, steam pressure, or other characteristics in the system 100. This allows the MD controller 122 to control various characteristics of the sheet 104. Also, the MD controller 122 can implement grade change control functionality, such as by incorporating or implementing a grade change controller 136 in the MD controller 122. The grade change controller 136 could also reside outside of and interact with the MD controller 122.

The grade change controller 136 implements grade changes in the system 100 more efficiently. For example, the grade change controller 136 may allow the paper machine 102 to transition from the production of one grade of sheet 104 to another grade of sheet 104 more rapidly. This may help to reduce or minimize the quantity of unmarketable product produced during the grade change. Additional details regarding this grade change control functionality are provided below.

Although FIGS. 1A and 1B illustrate one example of a paper production system 100, various changes may be made to FIGS. 1A and 1B. For example, other systems could be used to produce or process paper products or other products. Also, while shown as including three controllers, the controllers could be combined or further subdivided, and the production system 100 could include additional control functionality for controlling other aspects of the system 100. In addition, FIGS. 1A and 1B illustrate one example operational environment in which grade change control functionality could be implemented. The grade change control functionality could be implemented in any other suitable device or system.

Figure 2A:
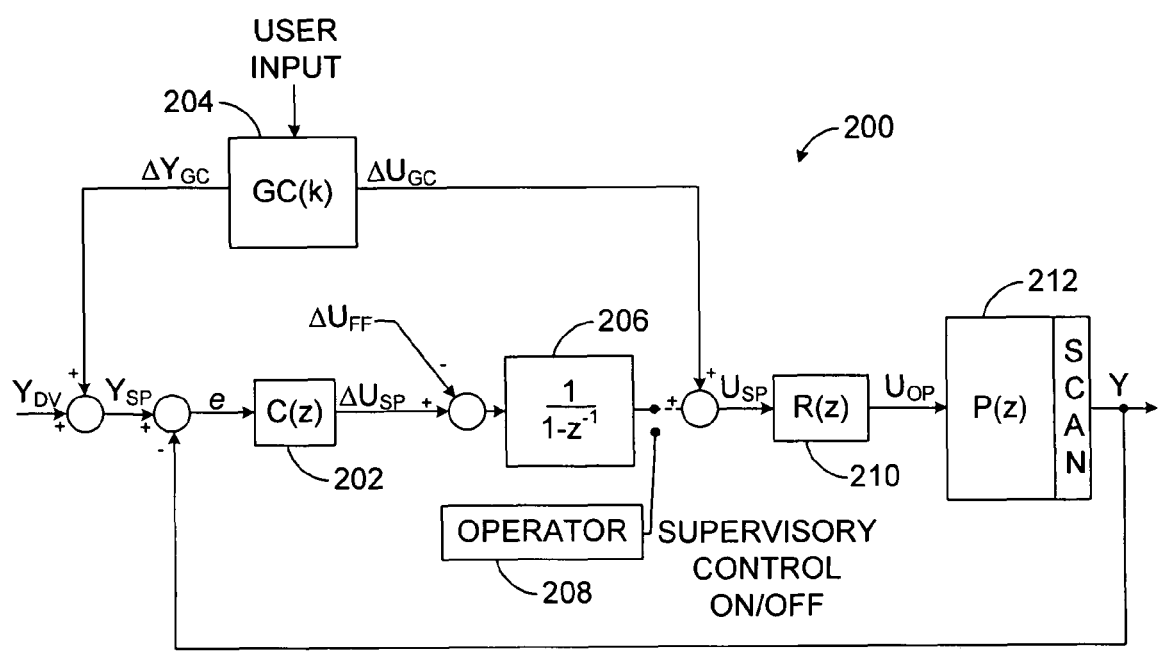
FIGS. 2A and 2B illustrate example grade change control models in accordance with this disclosure.
Figure 2B:
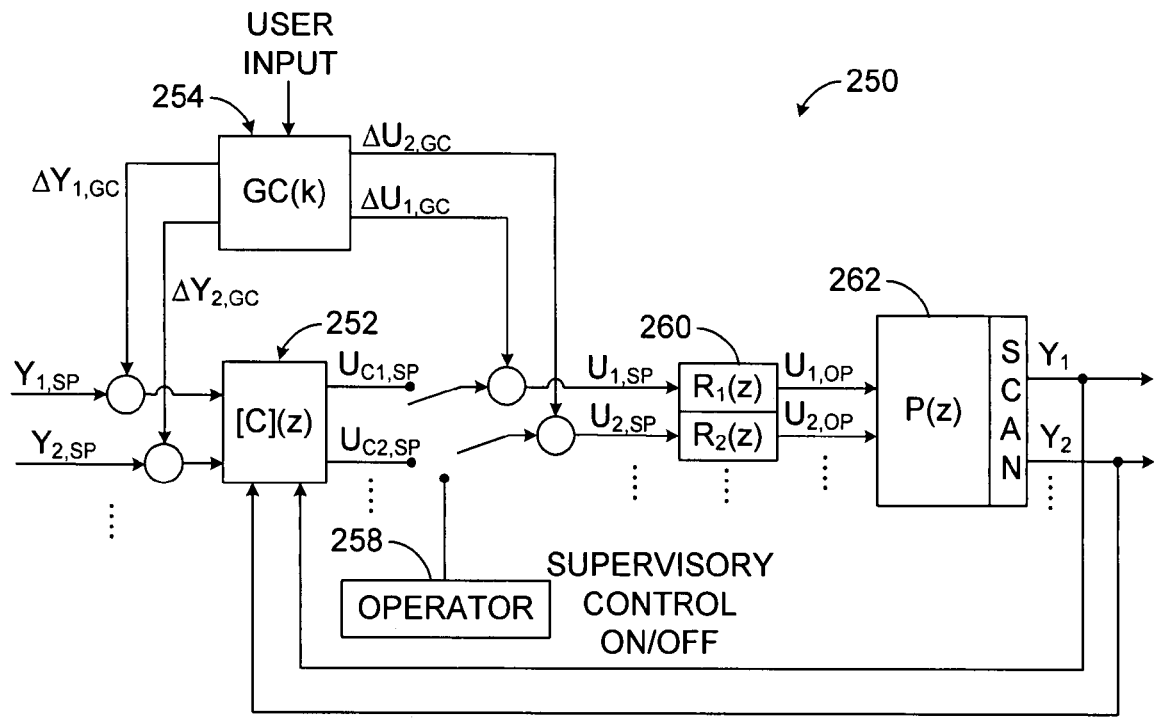

FIGS. 2A and 2B illustrate example grade change control models in accordance with this disclosure. The grade change control models shown in FIGS. 2A and 2B are for illustration only. Other grade change control models could be supported or used without departing from the scope of this disclosure. Also, for ease of explanation, the grade change control models in FIGS. 2A and 2B are described with respect to the production system 100 of FIGS. 1A and 1B. The grade change control models could be used or implemented in any other suitable device or system.

In general, the production system 100 is associated with various "process variables," which represent various aspects of the system 100 (such as speed, flow rate, or pressure). When the system 100 is used to manufacture the sheet 104, the MD controller 122 attempts to maintain a "controlled variable" (CV) at or near a desired value or within a desired range, such as by maintaining a moisture content of the sheet 104 within a specified range. The MD controller 122 attempts to maintain the controlled variable by altering one or more "manipulated variables" (MVs), such as by adjusting an opening of a valve or a speed of the paper machine 102. A "disturbance variable" (DV) represents a process variable that affects a controlled variable, where the disturbance variable can be considered by the MD controller 122 when altering the manipulated variables but generally cannot be controlled by the controller 122 (such as ambient temperature). By controlling certain controlled variables using certain manipulated variables, the MD controller 122 may increase or optimize the production of the sheet 104.

A grade change controller (such as the grade change controller 136 of FIG. 1A) generally provides or implements an automatic and consistent technique for changing the grade of the sheet 104 produced by the paper machine 102. This may be done by coordinated changes of manipulated variable targets and controlled variable targets when transitioning from one grade to another. The manipulated variables could include stock flow, machine speed, steam pressure, and headbox slice. The controlled variables could include sheet weight, sheet moisture, and headbox jet/wire ratio.

FIG. 2A represents a part of an MD control system in its context within a process 212 (such as the paper production system 100). A controller 202 represents a traditional single-variable controller C(z), such as a Dahlin controller. In this example, the controller 202 receives an input that is based on the difference between a controlled variable setpoint $Y_{SP}$ and a controlled variable measurement Y. The setpoint $Y_{SP}$ represents the desired value of the controlled variable, and the controlled variable measurement Y represents the actual (measured) value of the controlled variable in the process 212. In this example, the controlled variable setpoint $Y_{SP}$ represents a desired value $Y_{DV}$ (which may be set by an operator). The desired value $Y_{DV}$ can then be adjusted by a controlled variable trajectory $\Delta Y_{GC}$ calculated by a grade change control algorithm GC(k) 204.

The difference (or error) e between the setpoint $Y_{SP}$ and the measurement Y is calculated and used as an input to the controller 202. The error e is used by the controller 202 to generate an output $\Delta U_{SP}$ with the objective of minimizing the error e. The output $\Delta U_{SP}$ is possibly corrected with a feed-forward compensation signal $\Delta U_{FF}$ associated with other manipulated variables and measurable disturbances. The resulting output is then, in this example, integrated by an integrator 206 to form an absolute setpoint for the manipulated variable. The integrator 206 is represented here as an integrator in the discrete time Z-domain.

A process operator 208 can select whether to set the manipulated variable setpoint $U_{SP}$ manually or to use the integrated setpoint from the controller 202. In either case, a regulatory loop controller R(z) 210 (which could represent another controller 124 or 128) uses the selected setpoint to determine an actuator output signal $U_{OP}$. The actuator output signal represents a signal provided to an actuator (such as a valve or other type of actuator) in the production system 100, which is represented by the process P(z) 212. The actuator operates to alter the manipulated variable, thereby implementing a change that could possibly cause the controlled variable measurement Y to reach the controlled variable setpoint $Y_{SP}$.

Prior to a grade change, the grade change control algorithm 204 may calculate target values for the controlled and manipulated variables based on desired values for the next grade and other constraints. Based on these target values, an internal process model, and the configuration of the grade change control algorithm 204, the grade change control algorithm 204 calculates a (theoretical) trajectory for the manipulated variable to transfer the controlled variable in the process 212 from the initial grade to the desired grade. The grade change control algorithm 204 also calculates a trajectory for the controlled variable.

At the grade change, the grade change control algorithm 204 updates the current setpoints $Y_{SP}$ and $U_{SP}$ for the controlled variable and manipulated variable, respectively. This is done by adjusting the setpoints $Y_{SP}$ and $U_{SP}$ with the controlled variable trajectory $\Delta Y_{GC}$ and the manipulated variable trajectory $\Delta U_{GC}$.

In a scenario with a perfect internal process model in the grade change control algorithm 204, the adjustments in the manipulated variable setpoint $U_{SP}$ cause a change in the process 212, which may be observed with the measurements Y. The changes in the measurements Y correspond, in this scenario, to the calculated changes in the controlled variable $\Delta Y_{GC}$. Hence, the setpoint $Y_{SP}$ for the controlled variable equals the measurements Y for the controlled variable.

In a "real world" scenario, there is typically a difference between the actual process 212 and the internal process model in the grade change control algorithm 204. There may also be disturbances in the process 212 that are not captured in the internal process model of the grade change control algorithm 204. The changes in measurements Y caused by the adjustments of the manipulated variable by the grade change control algorithm 204 may therefore not be identical to the calculated change of measurements $\Delta Y_{GC}$. Without any further action, the setpoint for the controlled variable $Y_{SP}$ may differ or even converge from the measurements Y of the controlled variable.

To minimize the difference between the calculated controlled variable trajectory and the measurements Y of the controlled variable, the controller 202 may be used. In this case, the controller 202 works as described above in parallel with the grade change control algorithm 204. The difference between the calculated controlled variable trajectory and the measurements Y of the controlled variable cause the error e to be non-zero, and the controller 202 starts to control the process 212 via the manipulated variable to minimize e.

The example shown in FIG. 2A may represent one of multiple controller loops. For example, each controller loop may control one controlled variable to its setpoint by adjusting one manipulated variable setpoint. The one manipulated variable setpoint may be adjusted by a feed-forward signal from one or more other controller loops. All controller loops may share the same grade change control algorithm 204. Even though each controller loop is not multi-variable in this example, the grade change control algorithm 204 can be multi-variable and thus may consider cross-coupling between variables. A cross coupling is said to occur when one manipulated variable affects more than one controlled variable. A change in one manipulated variable to control one controlled variable may therefore need to be compensated by adjusting other manipulated variable(s) to avoid undesired changes in controlled variable(s) other than the one intended to change.

FIG. 2B represents a part of an MD control system in its context with a process 262 (such as the paper production system 100). A controller 252 represents a multi-variable controller [C](z), such as a PROFIT controller from HONEYWELL INTERNATIONAL INC.

In this example, the controller 252 receives multiple inputs. Each input is based on one of multiple setpoints $Y_{1,SP}$, $Y_{2,SP}$, and so on, which are associated with different controlled variables. Each setpoint may also be adjusted by one of multiple controlled variable trajectories $\Delta Y_{1,GC}$, $\Delta Y_{2,GC}$, and so on, which are calculated by a grade change control algorithm GC(k) 254. Based on the setpoints (or desired values), the controller 254 determines a set of manipulated variable setpoints $U_{C1,SP}$, $U_{C2,SP}$, and so on. Although equal in this example, the number of controlled variables does not have to equal the number of manipulated variables.

A process operator 258 can override one or more of the manipulated variable setpoints provided by the multivariable controller 252. A set of regulatory loop controllers 260 (which could represent other controllers 124 or 128) use the setpoints to determine a set of actuator output signals $U_{1,OP}$, $U_{2,OP}$, and so on. The actuator output signals represent signals provided to a set of actuators (such as valves or other type of actuators) in the production system 100, represented by the process P(z) 262. The actuators operate to alter the manipulated variables, thereby implementing changes that could possibly cause the controlled variable measurements to reach the controlled variable setpoints.

Prior to a grade change, the grade change control algorithm 254 may calculate target values for the controlled and manipulated variables based on desired values for the next grade and other constraints. Based on these target values, the internal process model, and the configuration of the grade change control algorithm 254, the grade change control algorithm 254 calculates the (theoretical) trajectories for the manipulated variables to transfer the controlled variables in the process 262 from the initial grade to the desired grade. The grade change control algorithm 254 also calculates trajectories for the controlled variables.

At the grade change, the grade change control algorithm 254 updates the current setpoints ($Y_{1,SP}$, $Y_{2,SP}$, and so on and $U_{1,SP}$, $U_{2,SP}$, and so on) for the controlled variables and manipulated variables. This can be done by adjusting the setpoints with the controlled variable trajectories ($\Delta Y_{1,GC}$, $\Delta Y_{2,GC}$, and so on) and the manipulated variable trajectories ($\Delta U_{1,GC}$, $\Delta U_{2,GC}$, and so on).

In a scenario with a perfect internal process model in the grade change control algorithm 254, the adjustments in the manipulated variable setpoints cause changes in the process 262, which may be observed with the controlled variable measurements. The changes in the measurements correspond, in this scenario, to the calculated changes in the controlled variables ($\Delta Y_{1,GC}$, $\Delta Y_{2,GC}$, and so on). As a result, the setpoints for the controlled variables equal the measurements for the controlled variables.

In a "real world" scenario, there may be a difference between the actual process 262 and the internal process model in the grade change control algorithm 254. There may also be disturbances in the process 262 that are not captured in the internal process model of the grade change control algorithm 254. The changes in the measurements caused by the adjustments to the manipulated variables by the grade change control algorithm 254 may not be identical to the calculated changes to the controlled variables. Without any further action, the setpoints for the controlled variables may differ or even converge from the measurements of the controlled variables.

To minimize the differences between the calculated controlled variable trajectories and the measurements of the controlled variables, the multi-variable controller 252 may be used. The controller 252 may work as described above in parallel with the grade change control algorithm 254. The differences between the calculated controlled variable trajectories and the measurements of the controlled variables cause errors to be non-zero, and the controller 252 starts to control the process 262 via the manipulated variables to minimize the differences between the setpoints and the measured values.

Although FIGS. 2A and 2B illustrate examples of grade change control models, various changes may be made to FIGS. 2A and 2B. For example, FIGS. 2A and 2B represent example control models in which a grade change controller could be used. However, a grade change controller could be used in any control environment represented by any suitable control model. Also, while FIG. 2B illustrates the use of two controlled variables, the grade change controller could be used in conjunction with any multi-variable controller that is controlling any number of variables. Further, the grade change controller could operate without feedback from the process (without controlled variable measurements Y, $Y_1$, $Y_2$, etc.). This is commonly referred to as operating in "open loop." In addition, the grade change controller could be used with any type of MD control or without any MD controller.

Figure 3:
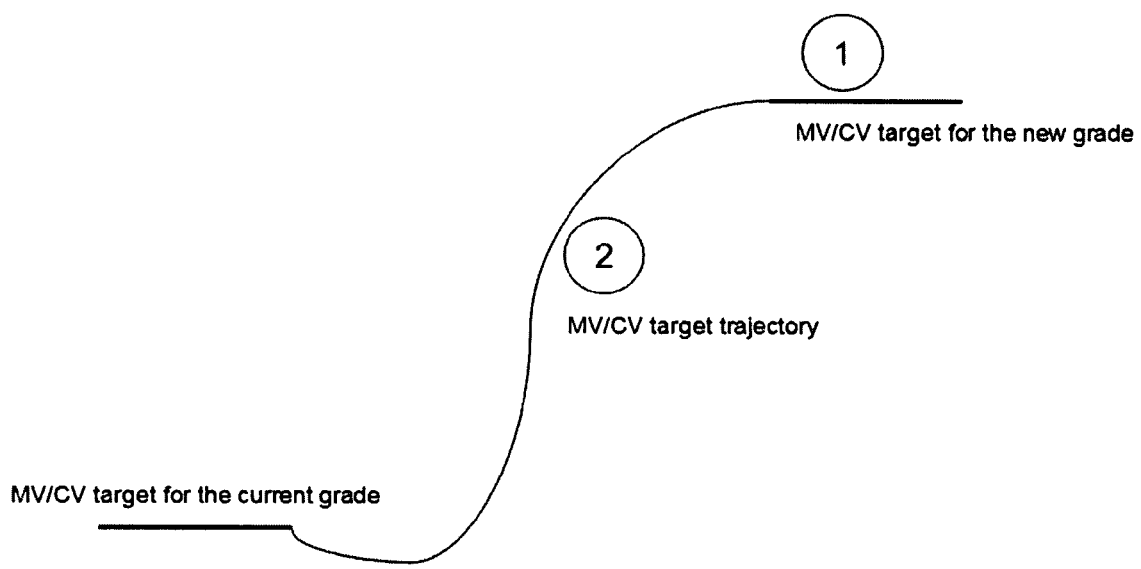
FIG. 3 illustrates example tasks during a grade change in accordance with this disclosure.

FIG. 3 illustrates example tasks during a grade change in accordance with this disclosure. For ease of explanation, the tasks in FIG. 3 are described with respect to the grade change controller 136 of FIGS. 1A and 1B implementing a grade change controller. The tasks shown in FIG. 3 could be implemented in any other suitable controller.

Each grade of product produced in the production system 100 is generally associated with one or more different controlled variable or manipulated variable targets. In other words, when producing one grade of sheet 104, the MD controller 122 may operate to maintain a certain controlled variable near one target value. When producing a different grade of sheet 104, the MD controller 122 may operate to maintain that same controlled variable near a different target value. The grade change controller 136 implements a grade change by taking the production system 100 from one operating point to another (such as from one CV or MV target to another) as fast and smooth as possible.

As shown in FIG. 3, the grade change controller 136 may first identify new targets for one or more manipulated and controlled variables. For example, the new targets for the controlled variables can be identified by loading new targets from a recipe database, and the new targets for the manipulated variables can be calculated using known controlled variable targets. In some embodiments, new targets for the manipulated variables can be identified by calculating the minimum required change in the manipulated variables while ensuring that the controlled variables reach their new targets. This could, for example, involve using a high-fidelity non-linear process model.

Once the new manipulated and controlled variable targets have been determined, the grade change controller 136 generates manipulated and controlled variable trajectories from the targets for the current grade to the targets for the next grade. In other words, the grade change controller 136 determines how to control the production system 100 to move from the old targets to the new targets. The main objective of the grade change controller 136 during this task may be to get all controlled variables from their old targets to their new targets as fast as possible.

In some embodiments, the manipulated and controlled variable target trajectories can be identified using an iterative process. The iterative process can involve the use of a linear model predictive controller (MPC) that takes hard constraints on the controlled and manipulated variables into account. A non-linear high-fidelity process model and a linear model parameter update function that updates the linear model in the MPC could also be used. The linear model in the MPC could be updated based on the non-linear model and the current operating point (the current values of the controlled and manipulated variables during an iteration). In addition, a stop condition module could be used to terminate a closed-loop target trajectory calculation.

Figure 4:
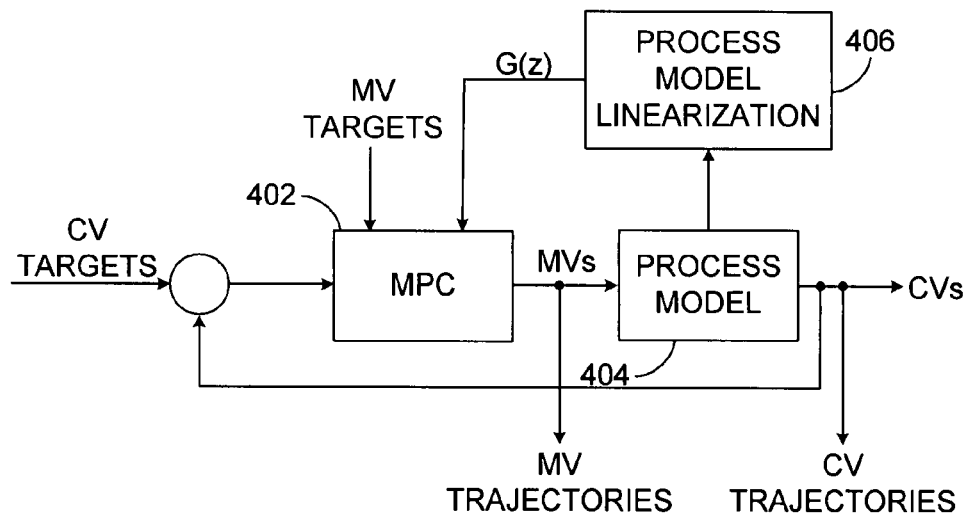
FIG. 4 illustrates an example grade change controller in accordance with this disclosure.

An example of how the grade change controller 136 can be configured to iteratively perform this second task is shown in FIG. 4. Here, a linear model predictive controller (MPC) 402 receives differences between controlled variable targets and estimated controlled variable values. The model predictive controller 402 uses this and other information to generate new values for the manipulated variables. These manipulated variable values form manipulated variable trajectories. The manipulated variable values are also provided to a process model 404, which represents the process (such as the production system 100) being controlled. The process model 404 is used to determine how the manipulated variable values affect the controlled variable values. These controlled variable values form controlled variable trajectories.

The controlled variable values are provided to a process model linearization module 406, which determines if and how models in the MPC 402 are updated based on the controlled variable values produced by the process model. For example, the process model linearization module 406 could determine how to update the gains and time delays in the model and provide these values to the MPC 402. If the model is updated, this process may be repeated. This can continue until the controlled variable values change by less than a specified amount.

Returning to FIG. 3, once the trajectories are determined, the grade change controller 136 controls the production system 100 to implement the grade change. In some embodiments, this could involve using a hard constrained model predictive controller to adjust the operation of the paper machine 102. However, other types of controllers could be used.

In particular embodiments, the grade change controller 136 is developed in MATLAB and is compiled into a dynamic link library (DLL). The dynamic link library can then be called in a .NET environment.

Although FIG. 3 illustrates examples of tasks during a grade change and FIG. 4 illustrates an example of a portion of a grade change controller 136, various changes may be made to FIGS. 3 and 4. For example, a grade change could involve a larger or smaller transition between targets. Also, different trajectories could be identified for moving between targets. In addition, components in the grade change controller 136 could be combined or omitted and additional components could be added according to particular needs.

Figure 5:
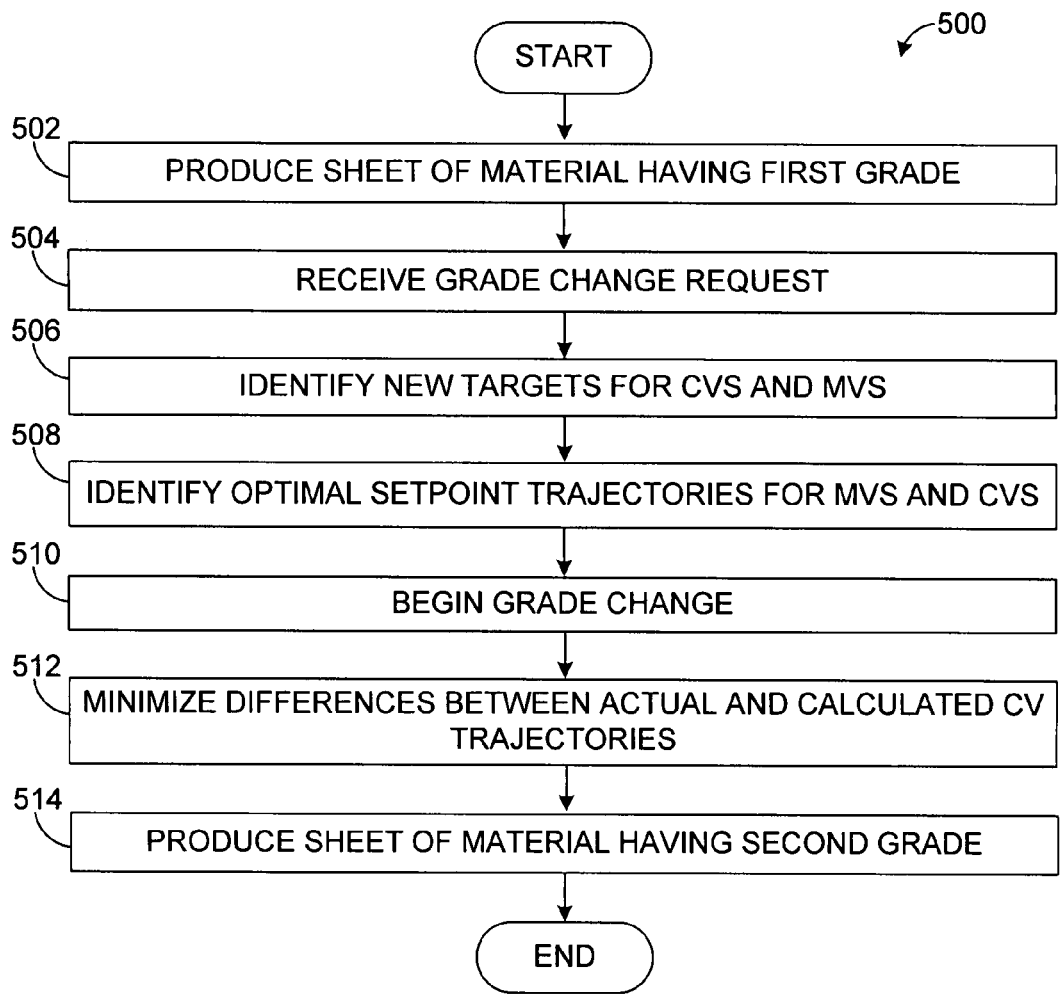
FIG. 5 illustrates an example method for grade change control in accordance with this disclosure.

FIG. 5 illustrates an example method 500 for grade change control in accordance with this disclosure. The embodiment of the method 500 shown in FIG. 5 is for illustration only. Other embodiments of the method 500 could be used without departing from the scope of this disclosure. Also, for ease of explanation, the method 500 is described with respect to the grade change controller 136 operating in the system 100 of FIGS. 1A and 1B. The method 500 could be used by any other suitable device and in any other suitable system.

A sheet of material having a first grade is produced at step 502. This may include, for example, the paper machine 102 producing a paper sheet 104 having a first paper grade. This may also include the MD controller 122 controlling the paper machine 102 to optimize the production of the sheet 104 having the first grade.

A grade change request is received at step 504. This could include, for example, receiving a grade change request from an operator, an automated grade change request from another controller or control system, or any other type of request from any suitable source.

New targets for the controlled variables and the manipulated variables are identified at step 506. This may include, for example, the grade change controller 136 identifying the new controlled variable targets in a recipe associated with the new grade. This may also include the grade change controller 136 using the new controlled variable targets to calculate new manipulated variable targets.

Optimal setpoint trajectories for the controlled and manipulated variables are identified at step 508. This may include, for example, the grade change controller 136 performing an iterative process to identify the setpoint trajectory that minimizes deviations between controlled variables and their targets and that minimizes deviations between manipulated variables and their targets. This may also include the grade change controller 136 attempting to minimize the number of changes made to the manipulated variables, attempting to minimize the total change in the manipulated variables, and attempting to minimize the time to reach the new controlled variable targets.

The grade change begins at step 510. This may include, for example, the grade change controller 136 adjusting the manipulated variable setpoint to the steam pressure controller 128 or the stock flow controller 124 to make the grade change occur as fast and smooth as possible. The grade change controller 136 uses the identified controlled and manipulated variable targets and trajectories to implement the grade change. During the grade change, the MD controller 122 may be used to minimize the difference between the actual and calculated trajectories for the controlled variables caused by model errors in the internal process model of the grade change controller 136 or by disturbances in the process 102. The setpoints for the MD controller 122 are, in that case, updated by the CV trajectories that are calculated by the grade change controller 136.

Once the grade change is complete, a sheet of material having a second grade is produced at step 514. This may include, for example, the paper machine 102 producing a paper sheet 104 having a second paper grade. This may also include the MD controller 122 controlling the paper machine 102 to optimize the production of the sheet 104 having the second grade.

Although FIG. 5 illustrates one example of a method 500 for grade change control, various changes may be made to FIG. 5. For example, the grade change could be initiated automatically, and no external request may be required at step 504.

The following represents additional details regarding one specific implementation of the grade change controller 136. These details are provided only to describe a specific implementation of the grade change controller 136. Other embodiments of the grade change controller 136 could be used without departing from the scope of this disclosure.

In this embodiment, the main manipulated and controlled variables involved in a grade change are provided in Table 1.

TABLE 1

| Manipulated Variables | Units | Controlled Variables | Units |
|---|---|---|---|
| Thick Stock Flows | l/min | Dry Weight | g/m² |
| Filler Flows | l/min | Ash | Percent |
| Steam pressures for dryer section | kPa | Moisture | Percent |
| Machine Speed | m/min | | |

To implement a grade change, the grade change controller 136 identifies new targets for these controlled variables using a recipe associated with a new grade of sheet 104 to be produced. The grade change controller 136 uses the new controlled variable targets to identify new targets for these manipulated variables. In some embodiments, an operator selects the manipulated variables for which the grade change controller 136 calculates new targets. In particular embodiments, an operator may, for various production or other reasons, select the new targets for at least some of the manipulated variables. The manipulated variables having targets set by an operator may be referred to as "fixed" manipulated variables, while the manipulated variables having targets set by the grade change controller 136 may be referred to as "free" manipulated variables.

Depending on the circumstances, the grade change controller 136 could operate under one of the following three scenarios:

(1) The grade change controller 136 determines targets for as many manipulated variables as there are controlled variables;

(2) The grade change controller 136 determines more targets for manipulated variables than there are controlled variables; and (3) The grade change controller 136 determines fewer targets for manipulated variables than there are controlled variables.

The problem of identifying new targets for the manipulated variables can be defined as solving a set of non-linear equations, where the number of non-linear equations equals the number of controlled variables considered. The number of controlled variables can be arbitrary depending on the implementation. In this embodiment, as indicated in Table 1, the number of controlled variables equals three. The non-linear equations are governed by the physical relationships between the manipulated variables and the controlled variables, which can be expressed as:

$$y_1 - f_1(K_1, u_1, u_2, \cdots, u_{N_u}) = 0 \quad (1)$$
$$y_2 - f_2(K_2, u_1, u_2, \cdots, u_{N_u}) = 0$$
$$y_3 - f_3(K_3, u_1, u_2, \cdots, u_{N_u}) = 0$$
$$\vdots$$
$$y_{N_y} - f_{N_y}(K_{N_y}, u_1, u_2, \cdots, u_{N_u}) = 0.$$

Here, $y_i$ represents the controlled variables, and $u_j$ represents the manipulated variables. Also, $K_i$ represents a lumped constant associated with physical constants and disturbance variables. The functions $f_k(\bullet)$ represent the non-linear functions giving theoretical steady-state values for each controlled variable given the manipulated variables and the constants.

Depending on which of the three possible scenarios defined above is occurring, there could be one solution, an infinite number of solutions, or no (exact) solution to the above set of Equations (1). An algorithm for solving the set of non-linear equations used by the grade change controller 136 may be generic enough to handle all three scenarios. One algorithm for solving the set of non-linear equations involves defining and solving the following optimization problem:

$$\min_u F(u_1, u_2, \cdots, u_{N_u}) \quad (2)$$
$$\text{s.t.} \quad G(u_1, u_2, \cdots, u_{N_u}) \leq 0$$
$$H(u_1, u_2, \cdots, u_{N_u}) = 0.$$

The objective function $F(\bullet)$ is explained in detail in the following paragraph. The inequality constraint function $G(\bullet)$ and the equality constraint function $H(\bullet)$ are described in more detail in subsequent paragraphs.

The objective function $F(\bullet)$ in Equation (2) can be partitioned into two functions:

$$F(u_1,u_2,\ldots,u_N) \equiv F_{CV}(u_1,u_2,\ldots,u_{N_u}) + F_{MV}(u_1, u_2, \ldots, u_{N_u}). \quad (3)$$

The first partition ($F_{CV}(\bullet)$) represents the weighted sum of the quadratic difference between the target values of the controlled variables and the calculated controlled variable values for a given working point (i.e. a given set of manipulated variables). That is:

$$F_{CV}(u_1,u_2,\ldots,u_{N_u}) \equiv v_1(y_{tgt,1} - f_1(u_1,u_2,\ldots,u_{N_u}))^2 + v^2 (y_{tgt,2} - f_2(u_1,u_2,\ldots,u_{N_u}))^2 + \ldots + v_{N_y}(y_{tgt,N_y} - f_{N_y}(u_1,u_2,\ldots,u_{N_u}))^2, \quad (4)$$

where $v_1, v_2, \ldots, v_n$ are normalization coefficients. Ideally, the value of this function is zero with an optimal set of manipulated variable targets for the next grade. This may or may not be achievable. If it is achieved, this optimal set of manipulated variable targets may yield controlled variables equal to what an operator has set as the desired controlled variables.

The second partition ($F_{MV}(\bullet)$) represents a weighted sum of the quadratic difference between the desired target values of the "free" manipulated variables for the next grade $u_{dt,k}$ and the target values of those manipulated variables. This can be expressed as:

$$F_{MV}(u_1,u_2,\ldots,u_{N_u}) \equiv w_1(u_{dt,1} - u_1) + w_2(u_{dt,2} - u_2)^2 + \ldots + w_{N_u}(u_{dt,N_u} - u_{N_u})^2. \quad (5)$$

The manipulated variable target values are the optimization variables in this optimization problem. As in the first partition, $w_1, w_2, \ldots, w_n$ represent normalization coefficients.

Normalization coefficients can be used if the values of the controlled variables are of different magnitudes or have different units compared to each other. This might also be the case for the manipulated variables. Normalization coefficients are therefore used to give each term in Equations (4) and (5) the same relative importance. The normalization coefficients can be defined to penalize ratio deviations from the targets, such as when:

$$v_1 = (u_{dt,1})^{-2}, v_2 = (u_{dt,2})^{-2}, \ldots, v_{N_y} = (u_{dt,N_y})^{-2} \quad (6)$$

and $$w_1 = (y_{tgt,1})^{-2}, w_2 = (y_{tgt,2})^{-2}, \ldots, w_{N_u} = (Y_{tgt,N_u})^{-2}. \quad (7)$$

An equality constraint function (the function $H(\bullet)$ in Equation (2)) can also be used depending on the current scenario. The equality constraint function is the same set of equations as in Equation (1). For example, if there are more manipulated variables than controlled variables, an equality constraint function may represent the set of Equations (1). In this case, the optimization problem is solved so that the calculated controlled variable values for the next grade are equal to the desired (target) controlled variable values. Since this is an underdetermined set of equations, there may be a degree of freedom for some manipulated variable values, meaning there might exist more than one set of manipulated variables that solves Equations (1). However, since the objective function in Equation (5) penalizes moves in the manipulated variables, the solution of Equations (1) may represent the solution that requires the minimum amount of moves in the manipulated variables.

If there are fewer manipulated variables than controlled variables, a solution may not exist to the set of Equations (1). An equality constraint function may therefore not be used with this scenario. The solution to the optimization problem may represent the manipulated variable values that yield controlled variable values that are closest to the desired controlled variable values as possible in a quadratic sense.

An inequality constraint function (the function $G(\bullet)$ in Equation (2)) can also be used. For example, non-equality constraints can be used to ensure that the controlled variables and the manipulated variables are within their maximum and minimum limits. For the controlled variables, this can be expressed as:

$$f_1(K_1, u_1, u_2, \cdots, u_{N_u}) - y_{1,max} \leq 0 \quad (9)$$
$$f_2(K_2, u_1, u_2, \cdots, u_{N_u}) - y_{2,max} \leq 0$$
$$\vdots$$
$$f_{N_y}(K_{N_y}, u_1, u_2, \cdots, u_{N_u}) - y_{N_y,max} \leq 0$$

$$y_{1,min} - f_1(K_1, u_1, u_2, \cdots, u_{N_u}) \leq 0$$
$$y_{2,min} - f_2(K_2, u_1, u_2, \cdots, u_{N_u}) \leq 0$$
$$\vdots$$
$$y_{N_y,min} - f_{N_y}(K_{N_y}, u_1, u_2, \cdots, u_{N_u}) \leq 0$$

For the manipulated variables, this can be expressed as:

$$u_1 - u_{1,max} \leq 0 \quad (10)$$
$$u_2 - u_{2,max} \leq 0$$
$$\vdots$$
$$u_{N_u} - u_{N_u,max} \leq 0$$

$$u_{1,min} - u_1 \leq 0$$
$$u_{2,min} - u_2 \leq 0$$
$$\vdots$$
$$u_{N_u,min} - u_{N_u} \leq 0.$$

Figure 6:
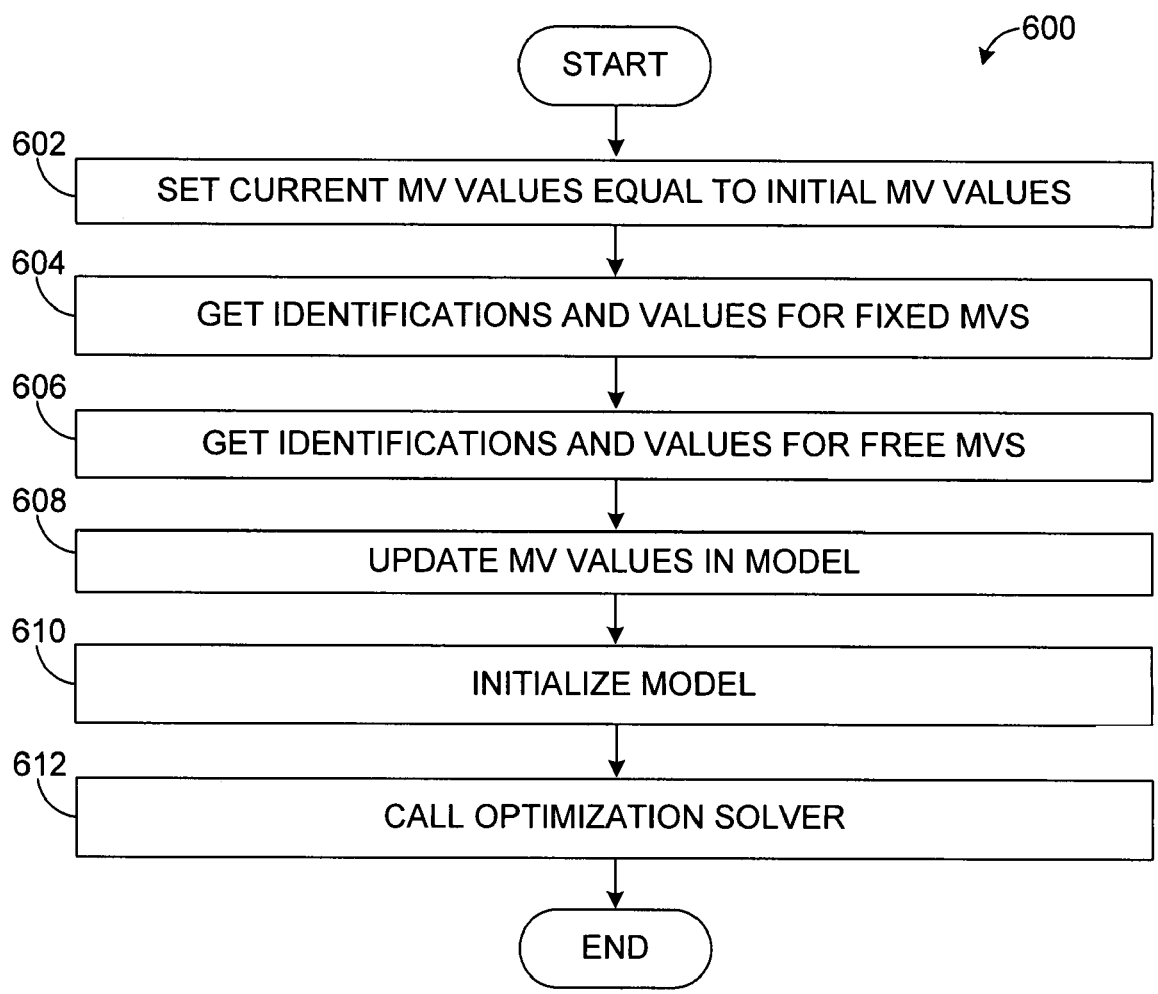
FIGS. 6 through 9 illustrate example methods performed by a particular implementation of a grade change controller in accordance with this disclosure.

An example of this process is illustrated in FIG. 6. More specifically, FIG. 6 illustrates an example method 600 for controlled variable and manipulated variable target calculation. As shown in FIG. 6, the grade change controller 136 sets the "current" manipulated variable values equal to the initial manipulated variable values at step 602. The initial manipulated variable values may represent the actual values of the manipulated variables prior to a grade change.

The grade change controller 136 obtains identification strings and target values of any fixed manipulated variables at step 604. The grade change controller 136 also obtains identification strings and desired values of any free manipulated variables at step 606.

A paper machine process model is updated with the manipulated variable values at step 608. The paper machine process model may represent a non-linear model of the paper machine 102, such as a non-linear dryer model (associated with the dryer section 114) and a non-linear dry weight model. The process model is then initialized at step 610. This could include initializing the process model's state vectors and history buffers. At step 612, an optimization solver is called to solve the optimization problem. As described above, the optimization solver uses the process model in its internal calculations to calculate the steady-state values for the modeled process (i.e. the steady-state values of the controlled variables) given a set of manipulated variable values. The optimization solver "searches" for the set of manipulated variables minimizing the value of the objective function F(•) in Equation (2) and satisfying the constraints G(•) and H(•).

Once the target values for the manipulated variables are identified, the grade change controller 136 identifies a set of setpoint trajectories for the manipulated variables and the controlled variables. The trajectories ideally are used to reach the desired controlled variable values for the next product grade. The calculated manipulated variable trajectories and the corresponding calculated controlled variable trajectories can be calculated "off-line" before the actual grade change occurs. When the grade change is initiated, the manipulated variable trajectories may be implemented by the MD controller 122, meaning the manipulated variable and controlled variable setpoints may be updated with the trajectories.

The target trajectory calculation can be formulated as a standard multi-variable predictive controller problem. Given a specific process (process model), the MPC problem attempts to:

(1) Minimize the deviation between the controlled variable trajectories and the new controlled variable targets over a prediction horizon;

(2) Minimize the deviation between a set of target values for the manipulated variables and the manipulated variable trajectories over a control horizon; and (3) Penalize moves in the manipulated variable trajectories.

The manipulated variable targets are the variables available for the MPC to solve the MPC problem. To be able to calculate the controlled variables for a given set of manipulated variables, the MPC uses a process model. By trying to minimize the deviation between the controlled variable trajectories and the controlled variable targets during a grade change, the time for the grade change may be reduced or minimized.

In some embodiments, the MPC is implemented using a cross direction multi-variable predictive controller (CD-MPC) (such as the one described in U.S. Pat. No. 6,807,510B1, which is hereby incorporated by reference). The MPC may use linear process models internally, and a linear process model in the MPC may be updated at every iteration step (every MPC update) with a linearized process model calculated by a non-linear model. The modeled controlled variable values from the non-linear process model can also be used as feedback to the MPC. The manipulated variable outputs from the MPC can be saved at each iteration step to build the manipulated variable trajectories. The iterations may continue until the trajectories have converged.

The MPC uses an internal process model, and some numerical calculations in the MPC are based on a gain matrix in the model. This matrix often needs to be reconditioned to increase numerical stability. In particular embodiments, the condition number of the gain matrix in the MPC may be less than ten. Doing this may require that the gain matrix be scaled, which can be done by performing a rescaling of the gain matrix before it is used in the MPC. This scaling could be represented as:

$$G_s = D_y G D_u^{-1}, \quad (11)$$

where $G_s$ represents the rescaled gain matrix, G represents the "original" gain matrix, and $D_y$ and $D_u$ represent scaling matrices. The input to the MPC and the output from the MPC may also need to be rescaled. In the un-scaled case of the internal process model in the MPC, the following can be defined:

$$y = Gu. \quad (12)$$

This combined with Equation (11) may yield:

$$y = D_y^{-1} G_s D_u u \Rightarrow \underbrace{D_y y}_{y_s} = G_s \underbrace{D_u u}_{u_s}. \quad (13)$$

That is:

$$y_s = D_y y$$

$$u_s = D_u u, \quad (14)$$

which is the scaling of the input and output vectors. The scaling matrices $D_y$ and $D_u$ can be calculated using the following normalization scheme:

$$(D_u)_{j,j} = \left( \sum_{i=1}^{n} (G_{i,j})^2 \right)^{1/2} \quad (G \text{ is } n \times k). \quad (15)$$

In other words, the columns are normalized by the column two-norm, which gives $D_u$. Also:

$$(D_y)_{i,i} = \left( \sum_{j=1}^{k} ((GD_u^{-1})_{i,j})^2 \right)^{-1/2}. \quad (16)$$

Here, the rows in $GD_u^{-1}$ are normalized by the row two-norm, giving $D_y$. This is a simplified version of the scaling model discussed in U.S. Pat. No. 5,574,638 (which is hereby incorporated by reference).

A normalization may have to be introduce to give errors in the controlled variables and in the manipulated variables the same relative importance (or to give one or more properties higher importance). Three different approaches to normalization of the cost coefficients could be implemented in the algorithm:

(1) No normalization (the cost coefficients entered by the operator are used "as is");

(2) Normalization based on the initial and target values of each manipulated variable and controlled variable; and (3) Normalization based on the maximum and minimum limits of the manipulated variables and controlled variables.

Normalization based on the initial and target values of each manipulated variable and controlled variable could be performed as follows. Cost coefficients for deviating from the controlled variable targets can be defined, such as by the operator. The normalizations for these coefficients may be based on the maximum expected error between the controlled variables and the controlled variable targets, without considering any overshoots. The maximum expected error is the difference between the initial controlled variable values and the controlled variable targets, which can be expressed as:

$$e_{max,k} = |y_{init,k} - y_{final,k}|. \tag{17}$$

For all $e_{max,k}$ less than one, those values can be set to one to avoid division by small numbers, which can be expressed as:

$$\forall e_{max,k} \leq 1 \Rightarrow e_{max,k} = 1 \tag{18}$$

The cost matrix $Q_a$ can be defined as:

$$diag Q_a = \left[ \frac{q_{a,1}}{e_{max,1}^2}, \frac{q_{a,2}}{e_{max,2}^2}, \dots, \frac{q_{a,N_y}}{e_{max,N_y}^2} \right], \tag{19}$$

where $q_{a,k}$ represents the defined cost coefficients for controlled variable deviation from the controlled variable targets. A cost matrix for deviation from the manipulated variable targets can be created in a similar way. The maximum expected error for the manipulated variables can be expressed as:

$$e_{max,k} = |u_{init,k} - u_{final,k}|. \tag{20}$$

The values of $e_{max,k}$ that are less than one can be set to one. The cost matrix $Q_b$ can be expressed as:

$$diag Q_b = \left[ \frac{q_{b,1}}{e_{max,1}^2}, \frac{q_{b,2}}{e_{max,2}^2}, \dots, \frac{q_{b,N_u}}{e_{max,N_u}^2} \right], \tag{21}$$

where $q_{b,k}$ represents the defined cost coefficients for manipulated variable deviation from the manipulated variable targets. The normalization of the cost coefficients for changes in the manipulated variables (i.e. cost coefficients for $\Delta u_k$) can be based on the maximum allowed change in the manipulated variables $\Delta u_{max,k}$. The cost matrix $Q_c$ can be expressed as:

$$diag Q_c = \left[ \frac{q_{c,1}}{\Delta u_{max,1}^2}, \frac{q_{c,2}}{\Delta u_{max,2}^2}, \dots, \frac{q_{c,N_u}}{\Delta u_{max,N_u}^2} \right], \tag{22}$$

where $q_{c,k}$ represents the defined cost coefficients for changes in the manipulated variables.

Normalization based on the maximum and minimum limits of the manipulated variables and the controlled variables may be based on the maximum and minimum limits (hard constraints) of each controlled variable. These can be expressed as:

$$c_{a,k} = y_{max,k} - Y_{min,k}. \tag{23}$$

The cost matrix $Q_a$ can be expressed as:

$$diag Q_a = \left[ \frac{q_{a,1}}{c_{a,1}^2}, \frac{q_{a,2}}{c_{a,2}^2}, \dots, \frac{q_{a,N_y}}{c_{a,N_y}^2} \right], \tag{24}$$

where $q_{a,k}$ represents the defined cost coefficients for controlled variable deviation from controlled variable targets. The normalization in this case can be calculated in a similar way as the normalization coefficients for the controlled variable targets:

$$c_{b,k} = u_{max,k} - u_{min,k}, \tag{25}$$

with the cost matrix:

$$diag Q_b = \left[ \frac{q_{b,1}}{c_{b,1}^2}, \frac{q_{b,2}}{c_{b,2}^2}, \dots, \frac{q_{b,N_u}}{c_{b,N_u}^2} \right]. \tag{26}$$

The normalization of the cost for changes in the manipulated variables can be calculated in the same way as for the normalization of the cost for deviating from manipulated variable targets:

$$c_{c,k} = u_{max,k} - u_{min,k}, \tag{27}$$

with the cost matrix:

$$diag Q_c = \left[ \frac{q_{c,1}}{c_{c,1}^2}, \frac{q_{c,2}}{c_{c,2}^2}, \dots, \frac{q_{c,N_u}}{c_{c,N_u}^2} \right]. \tag{28}$$

As noted above, the process of identifying the trajectories may continue in an iterative manner until the trajectories converge. The trajectories may be considered to have converged if:

(1) The differences between the controlled variable targets and the calculated controlled variable values from the last iteration are within a "first order" limit value for all controlled variables that have this stop condition enabled;

(2) The change in the calculated controlled variable values between two iteration steps are within a "second order" limit value for all controlled variables that have this stop condition enabled;

(3) The differences between the target manipulated variable values (for the next grade) and the manipulated variable values output from the MPC at the last iteration are within a "first order" limit value for all manipulated variables that have this stop condition enabled; and/or (4) The changes in the manipulated variable values output by the MPC between two iteration steps are within a "second order" limit value for all manipulated variables that have this stop condition enabled.

Depending on how the grade change controller 136 is configured, each controlled or manipulated variable can have all, some, or none of these "stop conditions" enabled. A stop condition that is disabled may not be considered when the trajectory convergence is determined.

Using an MPC to minimize deviation between new targets for the controlled variables and calculated controlled variable trajectories over a prediction horizon may not give any control to the time needed for the grade change. The time needed for the grade change may be controlled, at least partially, by controlling the ramping of the controlled variables during the trajectory calculations from their initial values to their targets values. The length of this ramp could be set by the operator.

Figure 7:
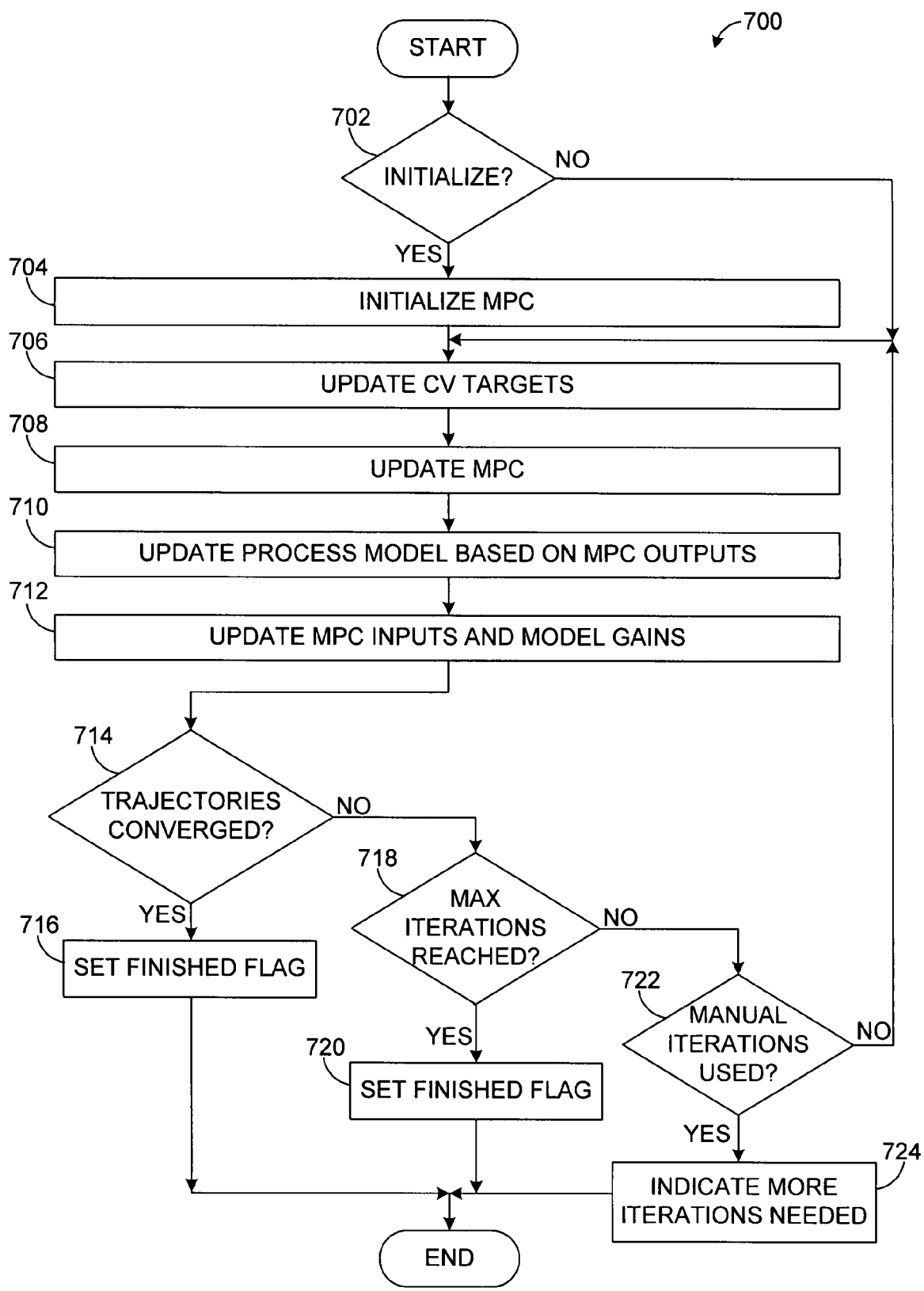

An example of this process is illustrated in FIG. 7. More specifically, FIG. 7 illustrates an example method 700 for variable trajectory calculation. As shown in FIG. 7, the grade change controller 136 determines whether to initialize the MPC at step 702. Initialization may be required, for example, if this is the first iteration of the method 700 or if the MPC has been reset. If initialization is required, the MPC is initialized with the current (pre-grade change) manipulated and controlled variable setpoints at step 704.

If the option to use controlled variable target ramping is set, the controlled variable targets to be used by the MPC in this iteration are updated at step 706. The MPC is then updated (executed) one time with the simulated controlled variable values from the last trajectory calculation iteration as an input (or the initial controlled variable values if it is the first iteration of the trajectory calculation) to simulate controller outputs at step 708. The outputs from the MPC represent simulated manipulated variable values. The non-linear process model is then updated with these manipulated variable values to generate simulated controlled variable values at step 710. The process gains at the working point (the state of the simulated process) are also calculated during this step. The MPC is updated with the new process gains at step 712.

The trajectories are checked for convergence at step 714. If the trajectories are determined to have converged, a "finished" flag is set at step 716, and the method 700 ends. Otherwise, a check is performed to determine if the maximum number of iterations of the trajectory calculation has been reached at step 718. If so, the "finished" flag is cleared at step 720, and the method 700 ends. This indicates that the method 700 is ending without the trajectories converging. If more iterations are possible, a check is made to determine if a "manual iterations" option is set at step 722. If this option is set, an indication that more iterations are required is set at step 724, and the method 700 ends regardless whether the trajectories have converged. The variables used by the trajectory calculation can be kept persistence in memory so the method 700 can be called again to perform the next iteration if an operator initiates additional iterations.

Figure 8:
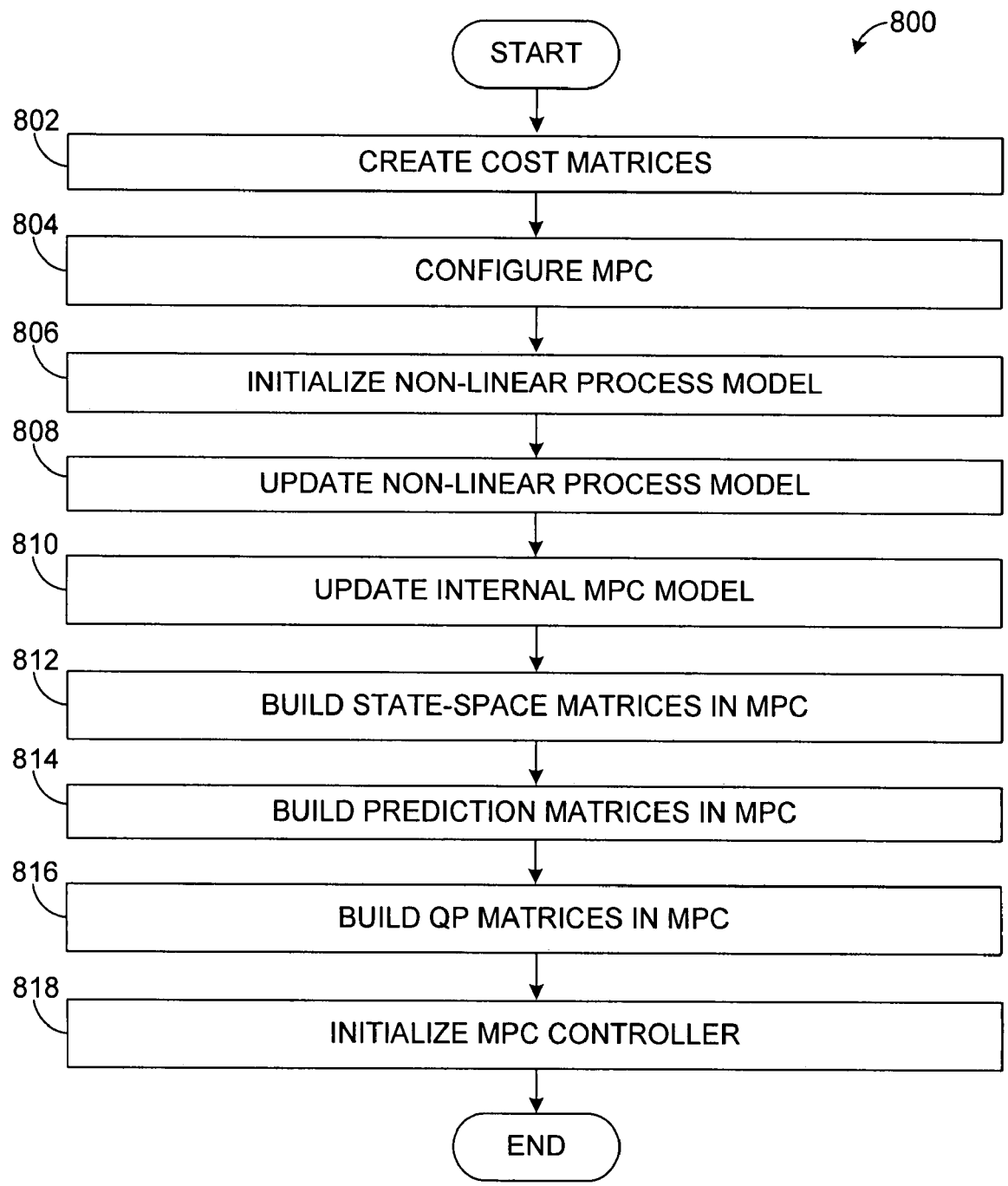

An example method for initializing the MPC (such as during step 704) is shown in FIG. 8. Cost matrices to be used in the MPC are calculated at step 802. Data structures used in the call to the MPC are set up with operator-specified or other configuration data at step 804. A non-linear process model (not the internal linear process model in the MPC) is initialized at step 806.

The non-linear process model is updated with the initial (pre-grade change) manipulated variable values at step 808. The process model then yields the (modeled) steady-state controlled variable values based on the given manipulated variable values. These controlled variable values may be used later during MPC initialization.

The process gains and the time delays in the MPC's internal process model are updated with the process gains and time delays calculated by the non-linear process model at step 810. The MPC builds state-space matrices for its internal process model at step 812, and the MPC builds prediction matrices at step 814. The MPC builds cost matrices (QP matrices) at step 816, and the MPC is initialized at step 818.

Figure 9:
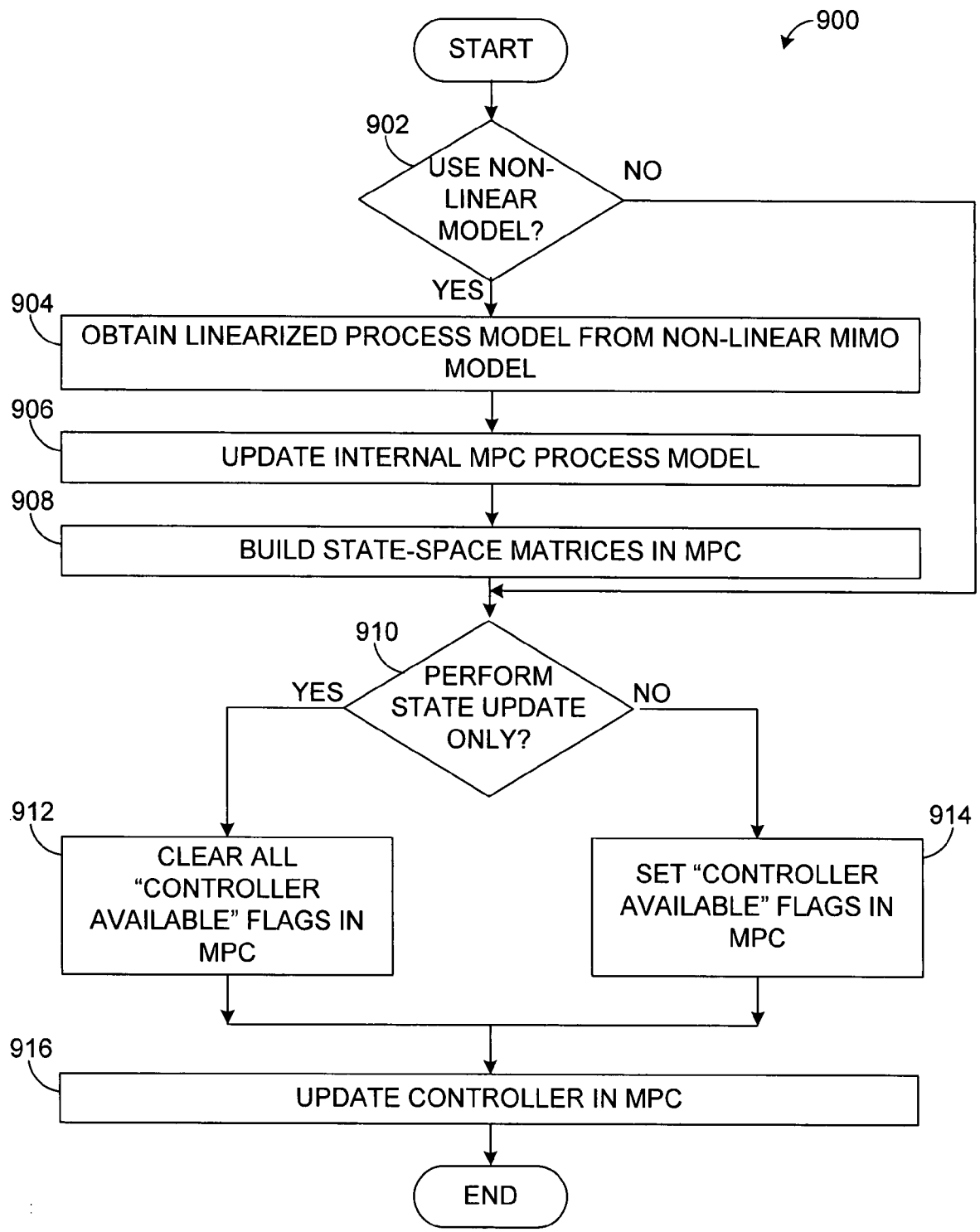

An example method for updating the MPC (such as during step 708) is shown in FIG. 9. A determination is made at step 902 whether an option to use a non-linear model is set. If so, the internal process model in the MPC is updated with a linearized process model from the latest model update. This may include obtaining a linearized process model from the non-linear model at step 904, updating the internal process model in the MPC with the new linearized process model at step 906, and building new state-space matrices for the MPC based on the updated process model at step 908.

A determination is made at step 910 whether only an update of the states of the MPC process model is to be performed. Depending on this determination, "Controller Available" flags are set or cleared. For example, if only a state update is being performed, all "Controller Available" flags may be set to zero at step 912. If a full controller update is being performed, the "Control Available" flags are set to what manipulated variables are actually available for control at step 914. At that point, the CDPMC controller is updated at step 916.

The above description and its associated figures have described and illustrated various aspects of one particular implementation of the grade change controller 136. Other embodiments of the grade change controller 136 could be used without departing from the scope of this disclosure.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of media.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
  identifying a target for at least one controlled variable and a target for at least one manipulated variable, the at least one manipulated variable and the at least one controlled variable associated with production of a product;
  calculating a trajectory for the at least one manipulated variable and a corresponding trajectory for the at least one controlled variable, the trajectories calculated using the targets and at least one equation that minimizes, for the trajectories, at least one of: a number of changes made to the at least one manipulated variable, a total change to the at least one manipulated variable, and a time to reach the variable targets; and implementing a grade change using the trajectories so as to transition from production of the product having a first grade to production of the product having a second grade.

2. The method of claim 1, wherein:

the product comprises a paper sheet produced by a paper machine;

the at least one controlled variable comprises one or more of: a dry weight of the paper sheet, an ash content of the paper sheet, and a moisture content of the paper sheet; and the at least one manipulated variable comprises one or more of: a thick stock flow, a filler flow, a steam pressure associated with a dryer section in the paper machine, and a machine speed associated with the paper machine.

3. The method of claim 1, wherein:

identifying the target for the at least one controlled variable comprises using a recipe associated with the second grade; and identifying the target for the at least one manipulated variable comprises using the target for the at least one controlled variable.

4. The method of claim 1, wherein calculating the trajectories comprises performing an iterative process in order to identify the trajectory for the at least one manipulated variable that:

minimizes deviations between each controlled variable and its target;

minimizes deviations between each manipulated variable and its target; and minimizes the number of changes to each manipulated variable.

5. The method of claim 4, wherein performing the iterative process comprises:

calculating values for the at least one manipulated variable, the values forming the trajectory for the at least one manipulated variable;

calculating corresponding values for the at least one controlled variable, the corresponding values forming the trajectory for the at least one controlled variable;

updating a process model used to identify the corresponding values for the at least one controlled variable; and repeating the calculating and updating steps until at least stop condition occurs.

6. The method of claim 5, wherein the at least one stop condition comprises one or more of:

a difference between the target for the at least one controlled variable and the calculated value for the at least one controlled variable from a preceding iteration is within a first limit;

a change in the calculated values for the at least one controlled variable between two consecutive iterations is within a second limit;

a difference between the target for the at least one manipulated variable and the calculated value for the at least one manipulated variable from a preceding iteration is within a third limit; and a change in the calculated values for the at least one manipulated variable between two consecutive iterations is within a fourth limit.

7. The method of claim 1, wherein implementing the grade change comprises adjusting operation of at least one processing or production component so that actual values of the at least one manipulated variable and the at least one controlled variable match or approximate the trajectories.

8. An apparatus comprising:

at least one processor operable to:

identify a target for at least one controlled variable and a target for at least one manipulated variable, the at least one manipulated variable and the at least one controlled variable associated with production of a product;

calculate a trajectory for the at least one manipulated variable and a corresponding trajectory for the at least one controlled variable using the targets and at least one equation that minimizes, for the trajectories, at least one of: a number of changes made to the at least one manipulated variable, a total change to the at least one manipulated variable, and a time to reach the variable targets; and implement a grade change using the trajectories so as to transition from production of the product having a first grade to production of the product having a second grade; and at least one memory operable to store the targets and the trajectories.

9. The apparatus of claim 8, wherein:

the product comprises a paper sheet produced by a paper machine;

the at least one controlled variable comprises one or more of: a dry weight of the paper sheet, an ash content of the paper sheet, and a moisture content of the paper sheet; and the at least one manipulated variable comprises one or more of: a thick stock flow, a filler flow, a steam pressure associated with a dryer section in the paper machine, and a machine speed associated with the paper machine.

10. The apparatus of claim 8, wherein:

the at least one processor is operable to identify the target for the at least one controlled variable using a recipe associated with the second grade; and the at least one processor is operable to identify the target for the at least one manipulated variable using the target for the at least one controlled variable.

11. The apparatus of claim 8, wherein the at least one processor is operable to calculate the trajectories by:

calculating values for the at least one manipulated variable, the values forming the trajectory for the at least one manipulated variable;

calculating corresponding values for the at least one controlled variable, the corresponding values forming the trajectory for the at least one controlled variable;

updating a process model used to identify the corresponding values for the at least one controlled variable; and repeating the calculating and updating steps until at least stop condition occurs.

12. The apparatus of claim 11, wherein the at least one stop condition comprises one or more of:

a difference between the target for the at least one controlled variable and the calculated value for the at least one controlled variable from a prior iteration is within a first limit;

a change in the calculated values for the at least one controlled variable between two consecutive iterations is within a second limit;

a difference between the target for the at least one manipulated variable and the calculated value for the at least one manipulated variable from a prior iteration is within a third limit; and a change in the calculated values for the at least one manipulated variable between two consecutive iterations is within a fourth limit.

13. The apparatus of claim 8, wherein the at least one processor is operable to implement the grade change by adjusting operation of at least one processing or production component so that actual values of the at least one manipulated variable and the at least one controlled variable match or approximate the trajectories.

14. The apparatus of claim 13, wherein:

the at least one processing or production component is controlled by at least one controller; and the at least one processor is operable to adjust the operation of the at least one processing or production component by altering at least one control signal generated by the at least one controller.

15. A computer readable medium embodying a computer program, the computer program comprising computer readable program code for:

identifying a target for at least one controlled variable and a target for at least one manipulated variable, the at least one manipulated variable and the at least one controlled variable associated with production of a product;

calculating a trajectory for the at least one manipulated variable and a corresponding trajectory for the at least one controlled variable, the trajectories calculated using the targets and at least one equation that minimizes, for the trajectories, at least one of: a number of changes made to the at least one manipulated variable, a total change to the at least one manipulated variable, and a time to reach the variable targets; and implementing a grade change using the trajectories so as to transition from production of the product having a first grade to production of the product having a second grade.

16. The computer readable medium of claim 15, wherein:

the product comprises a paper sheet produced by a paper machine;

the at least one controlled variable comprises one or more of: a dry weight of the paper sheet, an ash content of the paper sheet, and a moisture content of the paper sheet; and the at least one manipulated variable comprises one or more of: a thick stock flow, a filler flow, a steam pressure associated with a dryer section in the paper machine, and a machine speed associated with the paper machine.

17. The computer readable medium of claim 15, wherein:

the computer readable program code for identifying the target for the at least one controlled variable comprises computer readable program code for using a recipe associated with the second grade; and the computer readable program code for identifying the target for the at least one manipulated variable comprises computer readable program code for using the target for the at least one controlled variable.

18. The computer readable medium of claim 15, wherein the computer readable program code for calculating the trajectories comprises:

computer readable program code for calculating values for the at least one manipulated variable, the values forming the trajectory for the at least one manipulated variable;

computer readable program code for calculating corresponding values for the at least one controlled variable, the corresponding values forming the trajectory for the at least one controlled variable;

computer readable program code for updating a process model used to identify the corresponding values for the at least one controlled variable; and computer readable program code for repeating the calculating and updating steps until at least stop condition occurs.

19. The computer readable medium of claim 15, wherein the computer readable program code for implementing the grade change comprises computer readable program code for adjusting operation of at least one processing or production component so that actual values of the at least one manipulated variable and the at least one controlled variable match or approximate the trajectories.

20. A system, comprising:

a paper machine operable to produce a paper sheet having multiple grades; and a controller operable to initiate a transition from a first grade to a second grade by:

identifying a target for at least one controlled variable and a target for at least one manipulated variable;

calculating a trajectory for the at least one manipulated variable and a corresponding trajectory for the at least one controlled variable using the targets and at least one equation that minimizes, for the trajectories, at least one of: a number of changes made to the at least one manipulated variable, a total change to the at least one manipulated variable, and a time to reach the variable targets; and implement a grade change using the trajectories so as to transition from production of the paper sheet having the first grade to production of the product having the second grade.

* * * * *